United States Patent
Lee

(10) Patent No.: US 7,981,562 B2
(45) Date of Patent: Jul. 19, 2011

(54) FUEL CELL STACK WITH HEAT SINK ELEMENT

(75) Inventor: Sang-Won Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 966 days.

(21) Appl. No.: 11/480,617

(22) Filed: Jul. 3, 2006

(65) Prior Publication Data

US 2007/0009775 A1      Jan. 11, 2007

(30) Foreign Application Priority Data

Jul. 5, 2005 (KR) .................. 10-2005-0060117

(51) Int. Cl.
*H01M 8/04* (2006.01)
(52) U.S. Cl. ........ 429/468; 429/469; 429/480; 429/483; 429/514; 429/517; 429/519; 429/521
(58) Field of Classification Search .................. None
See application file for complete search history.

(56) References Cited

U.S. PATENT DOCUMENTS

| | | | |
|---|---|---|---|
| 5,942,348 A * | 8/1999 | Jansing et al. ................... | 429/32 |
| 2003/0113609 A1* | 6/2003 | Batfalsky et al. ................ | 429/34 |
| 2003/0118888 A1* | 6/2003 | Allen .............................. | 429/34 |
| 2004/0131914 A1* | 7/2004 | Bartholomeyzik et al. ..... | 429/34 |
| 2005/0214630 A1* | 9/2005 | Yoshida et al. ................. | 429/44 |
| 2005/0277007 A1* | 12/2005 | Yoshitake et al. .............. | 429/32 |
| 2007/0077477 A1* | 4/2007 | Mogi et al. ..................... | 429/32 |

FOREIGN PATENT DOCUMENTS

| | | |
|---|---|---|
| JP | 58-159164 | 10/1983 |
| JP | 61-55870 | 3/1986 |
| JP | 63-236268 | 10/1988 |
| JP | 5-299108 | 11/1993 |
| JP | 6-60905 | 3/1994 |
| JP | 8-138699 | 5/1996 |
| JP | 10-162842 * | 6/1998 |
| JP | 11-354142 | 12/1999 |
| JP | 2000-021434 | 1/2000 |
| JP | 2000-58074 | 2/2000 |
| JP | 2000-164234 | 6/2000 |
| JP | 2001-6702 | 1/2001 |
| JP | 2004-193012 | 7/2004 |
| JP | 2004-281079 | 10/2004 |
| JP | 2005-005137 | 1/2005 |

(Continued)

OTHER PUBLICATIONS

English abstract of Jp 58-159164U published Oct. 24, 1983.

(Continued)

*Primary Examiner* — Ula C Ruddock
*Assistant Examiner* — Tony Chuo
(74) *Attorney, Agent, or Firm* — Christie, Parker & Hale, LLP

(57) ABSTRACT

A fuel cell stack includes an electricity generating element, which generates electrical energy through a reaction of a fuel and oxygen. The electricity generating element includes a membrane-electrode assembly (MEA), a first separator positioned at a first side of the MEA and having a heat sink element positioned therein for dissipating heat generated through the reaction of the fuel and oxygen, and a second separator positioned at a second, opposite side of the MEA.

22 Claims, 10 Drawing Sheets

FOREIGN PATENT DOCUMENTS

KR    2003-0042633    6/2003

OTHER PUBLICATIONS

Patent Abstracts of Japan for publication No. 61-055870, published Mar. 20, 1986 in the name of Yoshikatsu Takabori et al.

Patent Abstracts of Japan for publication No. 05-299108, published Nov. 12, 1993 in the name of Niro Tamura.

Korean Patent Abstracts for publication No. 1020030042633 a, published Jun. 2, 2003 in the name of Jang Ho Cho, et al.

Patent Abstract of Japan, Pub. 06-060905, Published Mar. 4, 1994, in the name of Takada et al.

Patent Abstract of Japan, Pub. 08-138699, Published May 31, 1996, in the name of Shiga et al.

Patent Abstract of Japan, Pub. 2000-058074, Published Feb. 25, 2000, in the name of Sadano.

Patent Abstract of Japan, Pub. 2000-164234, Published Jun. 16, 2000, in the name of So et al.

Patent Abstract of Japan, Pub. 2001-006702, Published Jan. 12, 2001, in the name of Fukuda et al.

Patent Abstracts of Japan, Publication No. 10-162842, dated Jun. 19, 1998, in the name of Noriyuki Yamaga et al.

* cited by examiner

FUEL CELL STACK WITH HEAT SINK ELEMENT

CROSS-REFERENCE TO RELATED APPLICATION

This application claims priority to and the benefit of Korean Patent Application No. 10-2005-0060117 filed in the Korean Intellectual Property Office on Jul. 5, 2005, the entire content of which is incorporated herein by reference.

BACKGROUND

Each unit cell in some conventional fuel cell stacks is electrically connected to a separator itself or to a separate external terminal that is connected to a separator to generate electrical energy having a predetermined potential difference.

However, separators of a unit cell in such a conventional stack of a fuel cell are made of graphite or carbon composite, and thus, fabrication processes of the separators are very complicated. Therefore, the cost of fabrication is very high and unfavorable from an economical view.

A conventional stack of a fuel cell also generates a predetermined amount of heat in each unit cell during generation of electricity through a reaction of hydrogen or a fuel and oxygen. When such heat exceeds the appropriate temperature range, the performance of the MEA is deteriorated and stability of the unit cell cannot be ensured, resulting in damage of the unit cell in some serious cases.

SUMMARY

A fuel cell stack includes an electricity generating element, which generates electrical energy through a reaction of a fuel and oxygen. The electricity generating element includes a membrane-electrode assembly (MEA); a first separator positioned at a first side of the MEA and having a heat sink element positioned therein for dissipating heat generated through the reaction of the fuel and oxygen; and a second separator positioned at a second, opposite side of the MEA.

In some embodiments, the heat sink element is an extended portion of the first separator extending beyond an edge of the MEA, or the heat sink element is a heat sink plate connected with an edge of the first separator. The heat sink element may also include a slit.

In one embodiment, the electricity generating element includes a supporting plate in close contact with the first separator and reinforcing the first separator. The supporting plate may include a slit at a position corresponding to the heat sink element.

The first separator may be made of at least one metal selected from the group consisting of aluminum, copper, iron, nickel, cobalt, and alloys thereof, and may include an insulating layer coated on a surface thereof. In one embodiment, the first separator includes an oxide layer coated on a surface thereof.

The electricity generating element may further include a conducting element positioned between the MEA and each of the first separator and the second separator, the conducting element allowing a flow of electrons generated in the MEA. The conducting element may include a gas diffusion layer positioned between the MEA and each of the first separator and the second separator; and a portion extending beyond an edge of the gas diffusion layer in close contact with the first separator and the second separator and acting as a terminal element.

The gas diffusion layer may be formed of at least one material selected from the group consisting of a sheet-shaped carbon composite, carbon paper, and carbon cloth. The gas diffusion layer may also include a sealing member for preventing the fuel and oxygen from diffusing to an outside of the MEA. The sealing member may be formed at a position of the gas diffusion layer corresponding to edges of the MEA and may be made of a polymer material or a rubber material.

Another embodiment includes an adjacent electricity generating element having a terminal element; and connectors positioned between the terminal element of the electricity generating element and the adjacent electricity generating element to electrically connect the electricity generating elements in series. In one embodiment, the connectors are composed of a conductive carbon material, have a block shape, and are mounted between the terminal element of the electricity generating element and the adjacent electricity generating element.

A first insulating element to insulate each conducting element in the electricity generating element may also be included, which is made of a polymer material or a rubber material.

One embodiment also includes an adjacent electricity generating element adjacent to the electricity generating element and having a separator; and a second insulating element positioned between the first separator of the electricity generating element and the separator of the adjacent electricity generating element, and insulating the electricity generating element and the adjacent electricity generating element. The second insulating element may be made of a polymer material or a rubber material.

In another embodiment, the first separator includes a fuel passage path in close contact with the gas diffusion layer positioned at the first side of the MEA and supplies fuel to the gas diffusion layer, and the second separator includes an oxygen passage path in close contact with a second gas diffusion layer positioned at the second side of the MEA and supplies oxygen to the second gas diffusion layer. The fuel passage path or the oxygen passage path may be fabricated by press-forming of plate-shaped metal, or by molding.

In one embodiment, the first separator includes a fuel passage path in close contact with the gas diffusion layer positioned at the first side of the MEA and supplies fuel to the gas diffusion layer; and an oxygen passage path in close contact with a second gas diffusion layer on an opposite side of the first separator as the fuel passage path, the oxygen passage path supplying oxygen to the second gas diffusion layer.

In another embodiment, the first separator is made of non-conductive materials or relatively less conductive materials than carbonaceous materials. The first separator may alternatively be made of at least one material selected from the group consisting of ceramics, polymers, synthetic resins, and rubber materials.

DETAILED DESCRIPTION OF THE EMBODIMENTS

In the following detailed description, certain embodiments of the present invention are shown and described, by way of illustration. As those skilled in the art would recognize, the described embodiments may be modified in various ways, all without departing from the spirit or scope of the present invention. Accordingly, the drawings and description are to be regarded as illustrative in nature, rather than restrictive.

Figure 1:
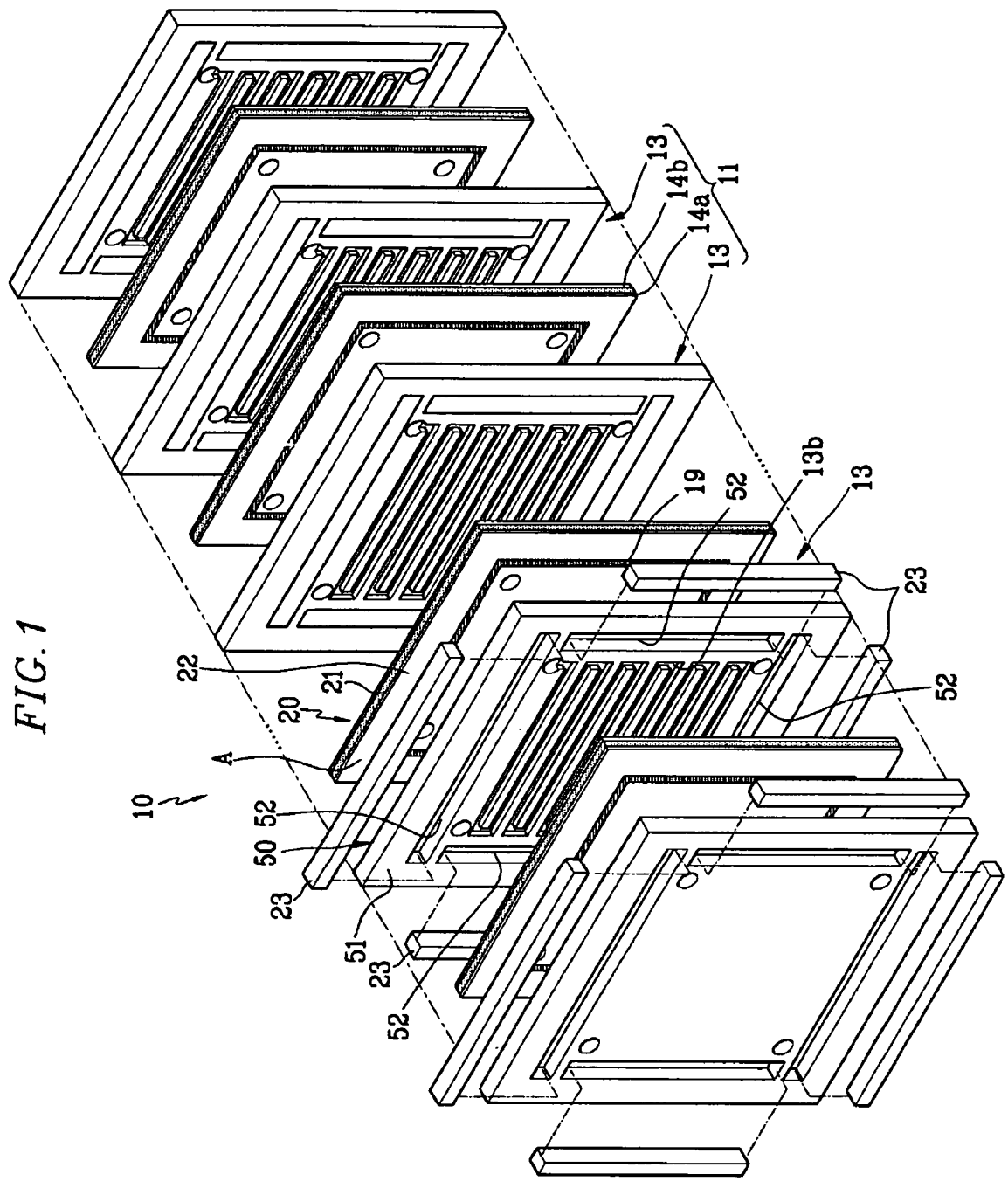
FIG. 1 is an exploded perspective view illustrating a fuel cell stack according to a first embodiment of the present invention.
Figure 2:
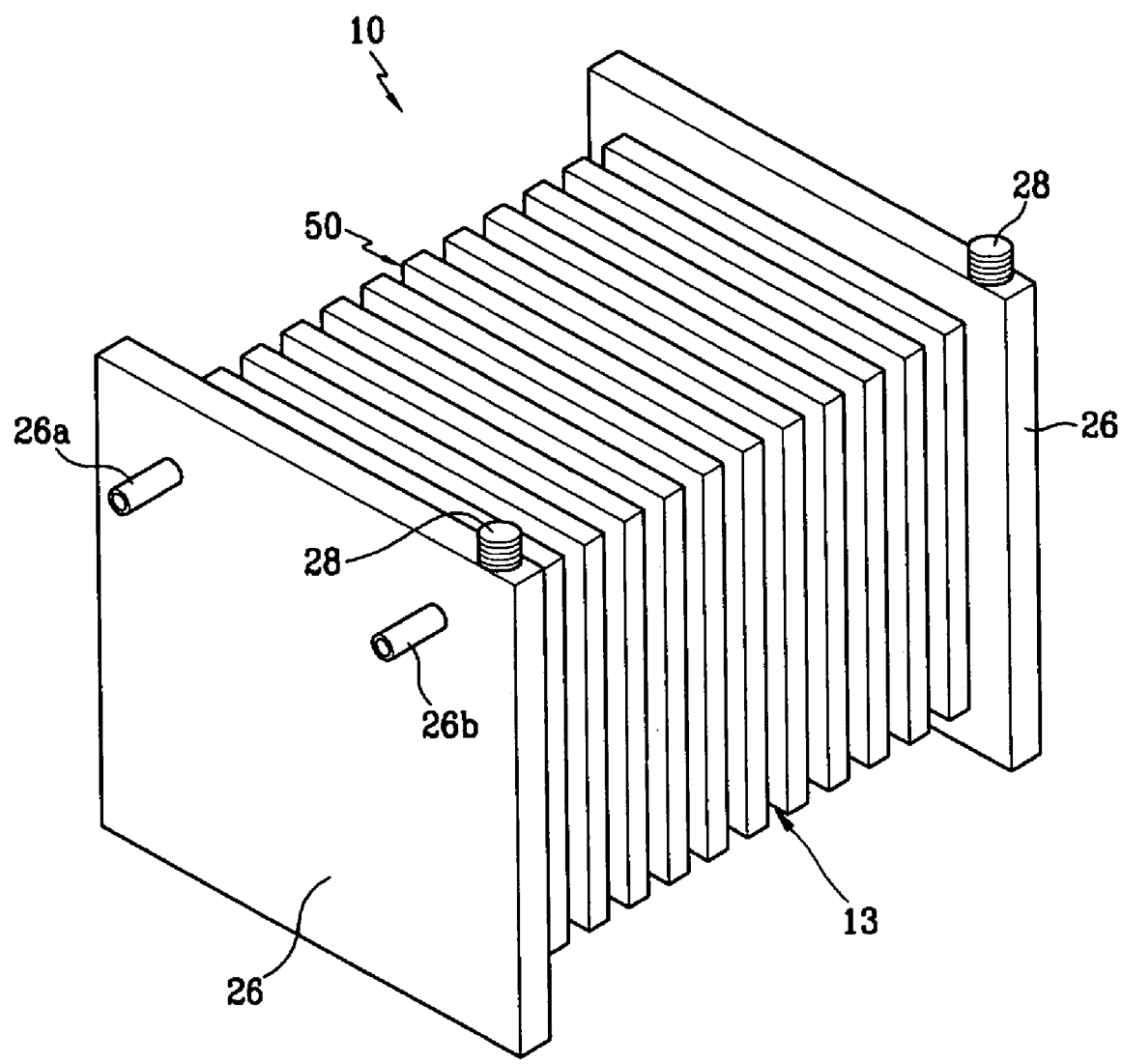
FIG. 2 is a perspective view showing a connection structure of the fuel cell stack of FIG. 1.
Figure 3:
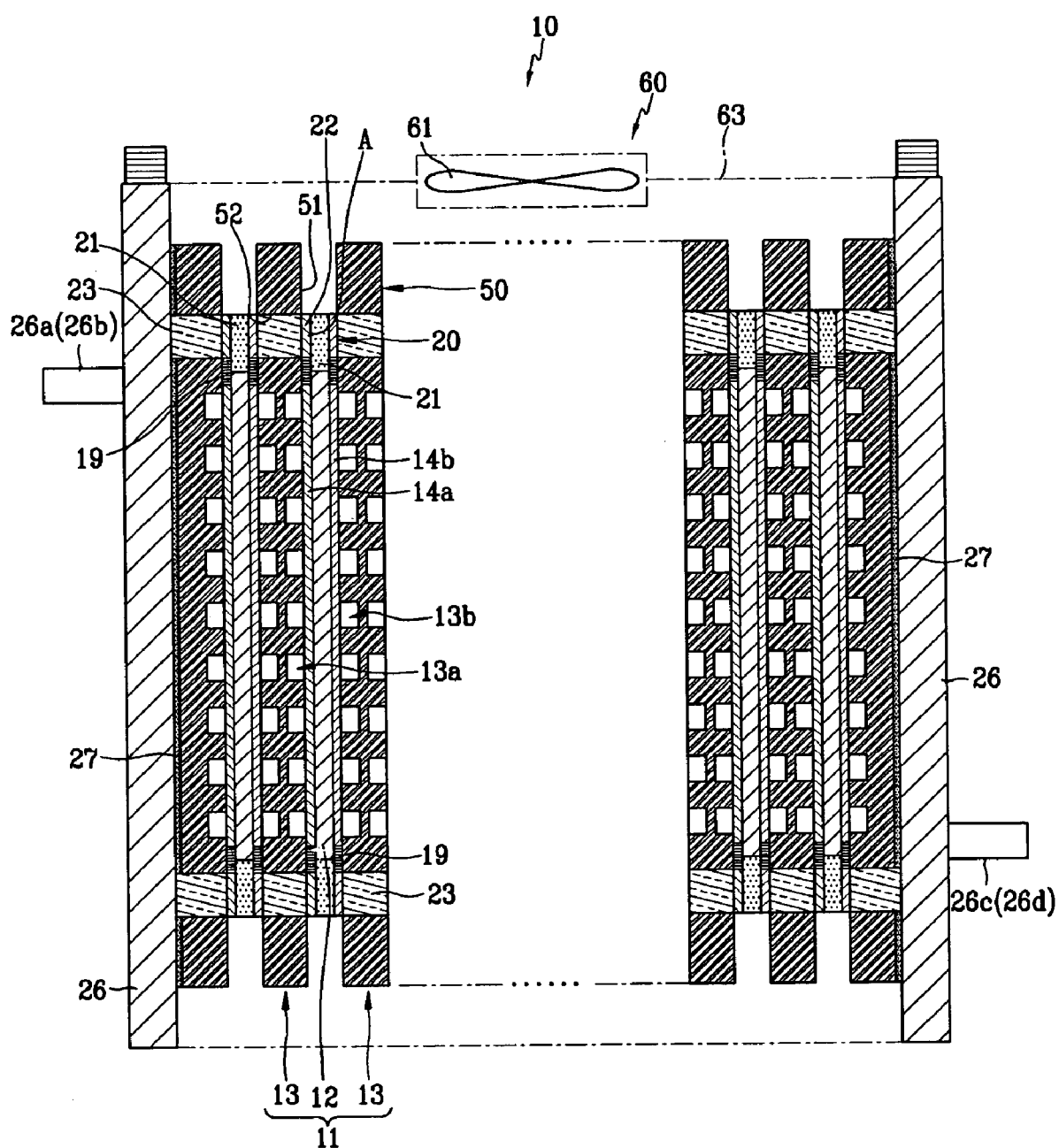
FIG. 3 is a cross sectional view of FIG. 2.

Referring to FIGS. 1-3, a fuel cell stack 10 according to a first embodiment of the present invention includes an electricity generating element 11 of a unit cell which generates electrical energy through oxidation of a fuel and reduction of oxygen.

In this embodiment, a plurality of such electricity generating elements 11 are stacked adjacent to one another to form the stack 10.

The fuel cell stack 10 uses hydrogen contained in a liquid or gas fuel, such as methanol, ethanol, liquid petroleum gas (LPG), liquefied natural gas (LNG), gasoline, or the like. The fuel cell stack 10 may adopt a direct oxidation fuel cell scheme where the electricity generating elements 11 generate electrical energy through oxidation of liquid or gas fuel and reduction of oxygen.

Alternatively, the fuel cell stack 10 may use as a fuel hydrogen generated from cracking of liquid or gas fuel in a general reformer. In this case, the fuel cell stack 10 adopts a polymer electrolyte membrane fuel cell scheme where the electricity generating elements 11 generate electrical energy through oxidation of hydrogen and reduction of oxygen.

The fuel cell stack 10 may use pure oxygen, stored in a separate supplier, or oxygen-containing air as a reaction gas at a cathode.

In the above fuel cell stack 10, each electricity generating element 11 includes two separators 13 positioned at either side of a membrane-electrode assembly (MEA) 12.

An anode (not shown) is positioned at one side of the MEA 12 and a cathode (not shown) is positioned at the other side of the MEA 12. Between the anode and the cathode, an electrolyte membrane (not shown) is positioned. At the anode, a fuel is oxidized to electrons and protons, the protons being transferred to the cathode through the electrolyte membrane. At the cathode, the protons, electrons transferred from an anode, and oxygen react to produce water.

The two separators 13 are substantially adjacent to each side of the MEA 12 and include a fuel passage path 13a, which enables fuel flow at one side of the MEA 12, and an oxygen passage path 13b, which enables oxygen flow at the other side of the MEA 12. The fuel passage path 13a is composed of channels formed at one side of one of the two separators 13 and supplies fuel to the anode of the MEA 12. The oxygen passage path 13b is composed of channels formed at one side of the other one of the two separators 13 and supplies oxygen to the cathode of the MEA 12.

As shown in FIGS. 1 to 3, the separators 13 of the stack 10, with the exception of the two outermost separators 13, have a two-sided flow structure where a fuel passage path 13a is formed at one side and an oxygen passage path 13b is formed at the other side. The fuel passage paths 13a and the oxygen passage paths 13b are linearly formed on respective sides of each separator 13, at a predetermined interval, and the ends of each path are alternately connected.

The separators 13 may be made of at least one metal, for example, aluminum, copper, iron, nickel, cobalt, or alloys thereof, and are in a shape of a metal plate. The fuel passage paths 13a and the oxygen passage paths 13b of the separators 13 may be fabricated by press-forming of a metal plate. According to one embodiment, they may be made by stamping of a metal plate. Alternatively, the separators 13 may be fabricated by injection molding or die-casting of a metal material.

Alternatively, the separator 13 may be made of relatively less conductive material than the carbonaceous materials, or non-conductive materials such as ceramics, polymers, synthetic resins, rubber materials, and so on using injection or extrusion molding.

In each electricity generating unit 11, gas diffusion layers 14a and 14b are disposed at each side of the MEA 12, between the MEA 12 and the separators 13, and diffuse the fuel and oxygen into the two electrodes of the MEA 12, as well as smoothly transferring electrons generated at the anode to a cathode of an adjacent MEA 12 through a terminal. Such gas diffusion layers 14a and 14b are generally made of carbon composite, carbon paper, and/or carbon cloth.

In operation of the fuel cell stack 10, the separators 13 supply fuel to the anodes of the MEAs 12 through the fuel passage paths 13a and oxygen to the cathodes of the MEAs 12 through the oxygen passage paths 13b during operation. The fuel is converted to electrons and protons through an oxidation reaction of the fuel at the anodes. The protons are transferred to the cathodes through the electrolyte membranes, and the electrons are transferred to the cathodes through the separators 13, rather than through the electrolyte membranes. Movement of the electrons generates current, and the transferred electrons and protons react with oxygen to reduce the oxygen, thereby generating heat and water. The generated heat dries the MEA 12 and thus deteriorates performance characteristics of the stack 10.

In the present embodiment, the separators 13 of the fuel cell stack 10 are made of metal, and thus the separators 13 may be corroded by water, heat, and oxygen. Such corrosion of the separators 13 increases resistance, thereby limiting electron movement in the separators 13, and reduces conductivity of the separators 13. As a result, performance of the stack 10 is deteriorated.

A fuel cell stack 10 according to the present embodiment includes heat sink elements 50 for dissipating heat generated in electricity generating elements 11, and conducting elements 20 for making the electrons generated in each electricity generating element 11 flow through the entire stack 10.

Figure 4:
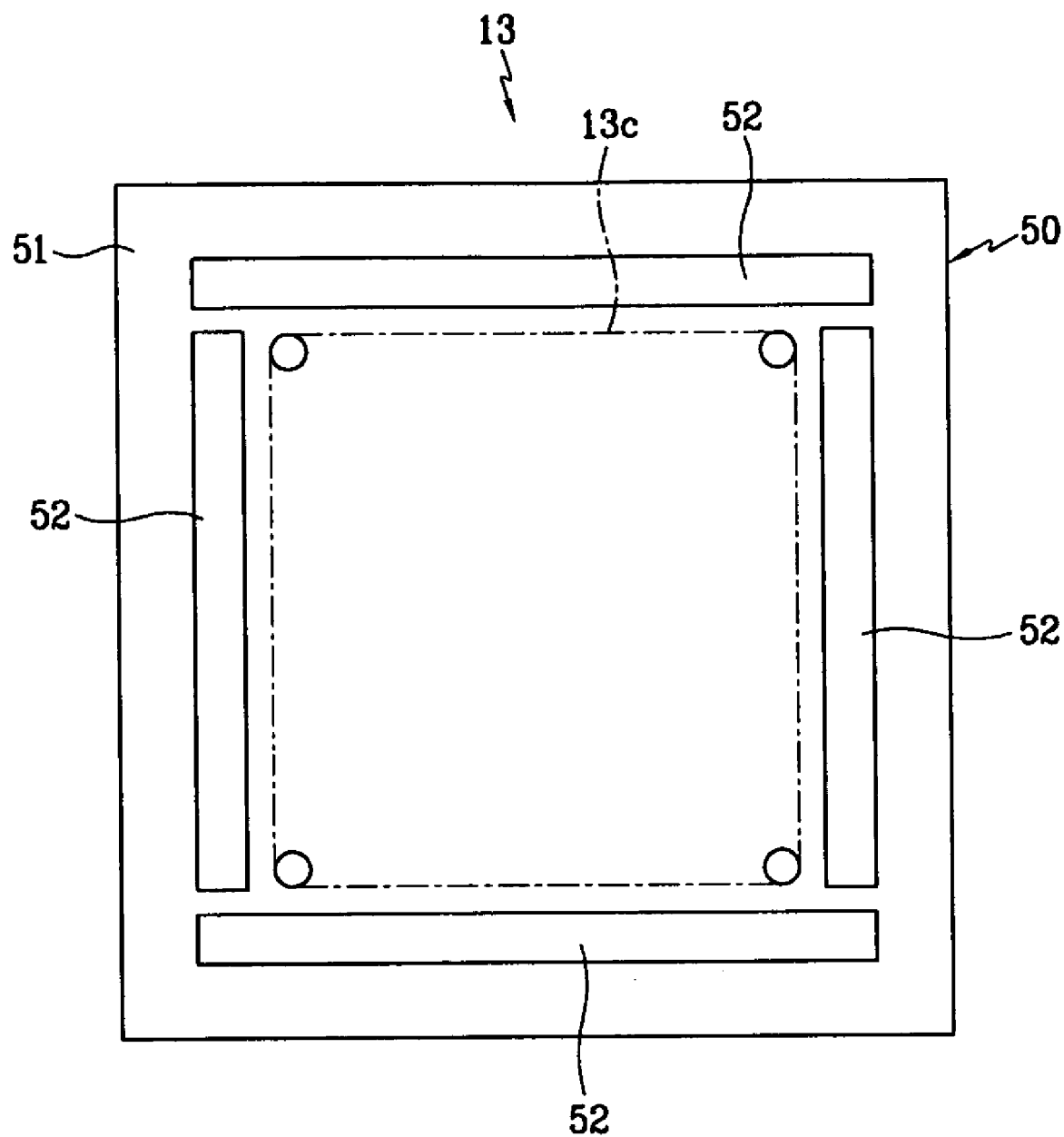
FIG. 4 is a plan schematic diagram of the separator shown in FIG. 1.

In the present embodiment, the heat sink elements 50 include extended portions 51 that extend outside the edges of the MEAs 12 and are peripherally extended portions. As shown in FIG. 4, which is a plan schematic diagram of a separator 13, the extended portion 51 is an area integrally extended from the edges of an active area 13c, indicated by an imaginary line in the drawing, that includes fuel passage paths 13a and oxygen passage paths 13b. The extended portion 51 may extend outside of at least one edge of the MEA 12

(FIG. 1). The extended portion 51 of the separator 13 may include slits 52 through which a connector 23, which will be described in further detail, can penetrate. The slits 52 are formed along the edge directions of the separator 13.

According to the present embodiment, a separator 13 is made of metal material and its extended portion 51 protrudes outside the MEA 12 with respect to an electricity generating element 11. Therefore, heat generated through a reduction reaction at a cathode of the MEA 12 is transferred to the separator 13 and is dissipated outside an electricity generating element 11 through the extended portion 51.

During these processes, the heat dissipated through the extended portions 51 of the separator 13 can be cooled by a coolant supplied by a coolant supplier 60, as illustrated in FIG. 3. The coolant supplier 60 intakes a coolant and supplies it to an electricity generating element 11. According to one embodiment, the coolant supplier may be composed of a fan 61 which intakes air at a predetermined rotating power and supplies air to an electricity generating element 11. As indicated by the imaginary line in FIG. 3, the fan 61 may be installed in a housing 63 surrounding the entire stack 10 and may supply air to the heat sink element 50 of each electricity generating element 11.

In the present embodiment, the conducting element 20 electrically connects between the electricity generating elements 11 through gas diffusion layers 14a and 14b. The gas diffusion layers 14a and 14b have portions extending outside the edges of the MEA 12.

The conducting element 20 according to the present embodiment includes portions indicated as "A" in the drawing extending outside the gas diffusion layers 14a and 14b. The extended portions act as terminal elements 22 in each electricity generating element 11 of the stack 10. The terminal elements 22 electrically connect each electricity generating element 11 and make the electrons generated in each electricity generating element 11 flow through the stack.

As shown in FIGS. 3 and 4, the edges of the gas diffusion layers 14a and 14b may be extended outside of the edges of the MEA 12 and the active areas 13c of the separators 13 to form the terminal elements 22. That is to say, the terminal elements 22 are formed extending from the edges of the gas diffusion layers 14a and 14b, and are outside of at least one edge of the MEA 12 and one edge of the active areas 13c of the separators 13. In the drawing, the terminal elements 22 are illustrated as extending outside the four edges of the gas diffusion layers 14a and 14b of the active area 13c of the separator 13. However, the present invention is not thereby limited.

Figure 5:
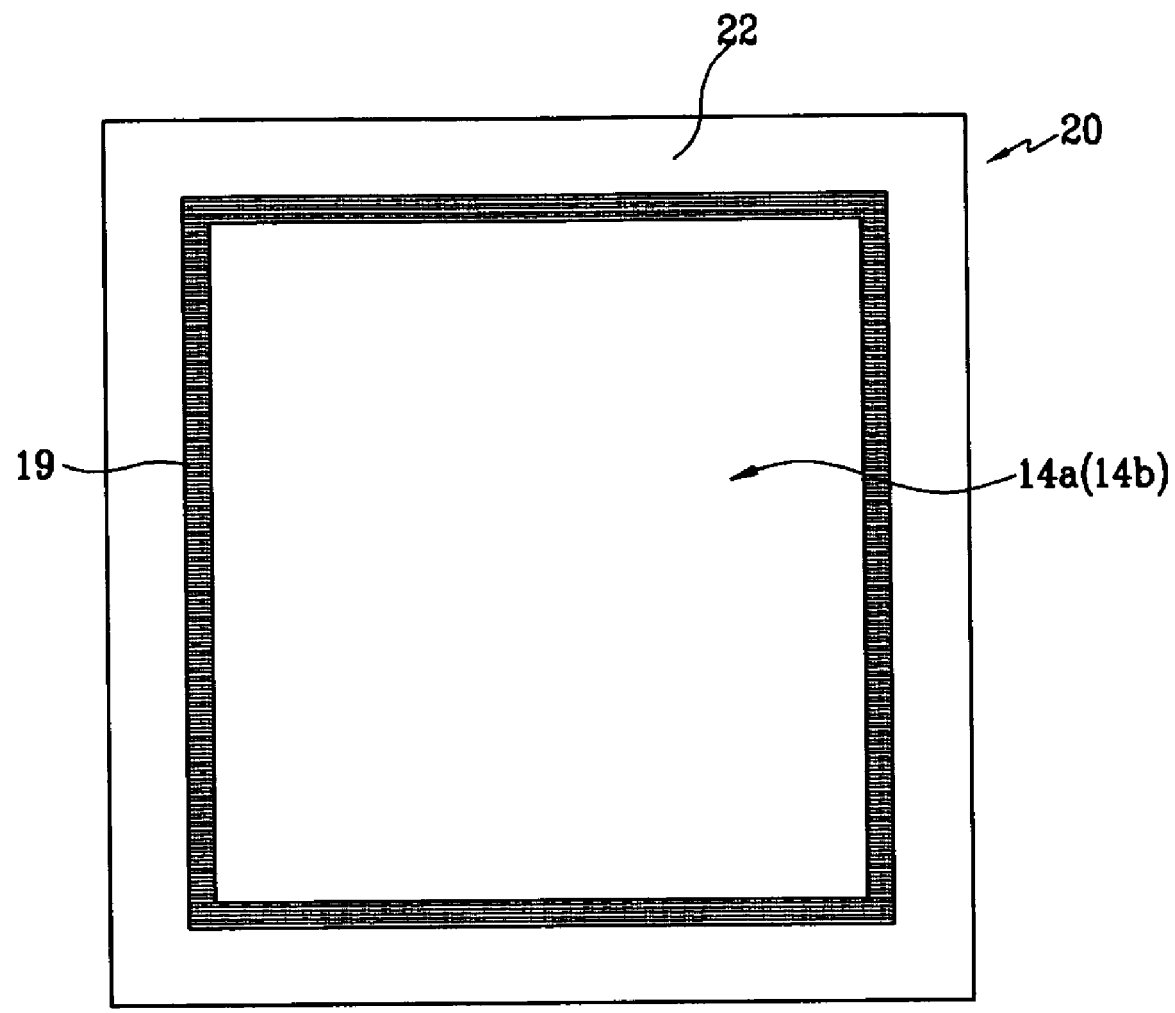
FIG. 5 is a plan schematic diagram of the gas diffusion layer shown in FIG. 1.

FIG. 5 is a plan schematic diagram of a gas diffusion layer illustrated in FIGS. 1-4. Gas diffusion layers 14a and 14b having the same structure as described above include sealing members 19 at an edge portion contacting the edge of the MEA 12 (FIG. 3). Each sealing member 19 blocks (or prevents) fuel and oxygen from diffusing to the terminal element 22 and leaking to the outside of the electricity generating element 11 (FIG. 3) when the fuel and oxygen diffuse through the gas diffusion layers 14a and 14b. The sealing member 19 also divides a region contacting the MEA 12 and the terminal element 22 of the entire gas diffusion layers 14a and 14b. The sealing member 19 is formed at a position of the gas diffusion layers 14a and 14b corresponding to the edges of the MEA 12 and is made of polymer material; of polytetrafluoroethylene (TEFLON), polyimide, or the like; and/or of a rubber material.

The fuel cell stack 10 includes first insulating elements 21 which substantially insulate the conducting element 20 in each electricity generating element 11.

The first insulating elements 21 may be formed between the terminal elements 22 of each electricity generating element 11. The terminal elements 22 positioned at the anodes of the MEAs 12 and the terminal elements 22 positioned at the cathodes of the MEAs 12 are electrically connected by connectors 23 to act as (+) and (−) terminals, having a predetermined potential difference, in each electricity generating element 11.

The first insulating elements 21 are formed in a shape of an insulating tape or an insulating sheet and are composed of a synthetic polymer such as phenol resin, polyurethane, polyester resin, polyamide, acryl, urea/melamine resin, and/or silicone resin; and/or are composed of a varnish-based material such as varnish.

The fuel cell stack 10 includes connectors 23, each of which electrically connects an area between a conducting element 20 positioned at one side of one of the electricity generating elements 11 and a conducting element 20 positioned at one side of an adjacent electricity generating element 11.

The connectors 23 connect electricity generated in adjacent electricity generating elements 11 in series in the entire stack 10. Each connector 23 acts as a conductor, which electrically connects an area between a conducting element 20 positioned at one side of one of the electricity generating elements 11 and a conducting element 20 positioned at one side of an adjacent electricity generating element 11.

For this purpose, the connectors 23 are composed of a conductive carbon material and have a block shape, and are mounted between the terminal elements 22 of adjacent electricity generating elements 11.

Each connector 23 according to the present embodiment is positioned between the terminal element 22 at the anode of one electricity generating element 11 and the terminal element 22 at the cathode of an adjacent electricity generating element 11.

The fuel cell stack 10 of the present embodiment includes current collecting plates 26 for collecting electricity at the outermost ends of the stack 10. The current collecting plates 26 are insulated from the outermost separators 13 by second insulating elements 27 as illustrated in the drawing. Connectors 23 are mounted between the terminal elements 22 of the conducting elements 20 positioned at the outermost ends of the stack 10 and the current collecting plates 26. The current collecting plates 26 are positioned substantially adjacent to the outermost separators 13, and thus, are for positioning the plurality of electricity generating elements 11 in close contact with each other by applying a pressure. The current collecting plates 26 are fastened by a connection member (not shown), for example, a bolt and a nut, a rivet, or the like, to position the plurality of electricity generating elements 11 in close contact with each other by applying a pressure.

In addition, each current collecting plate 26 includes a first inlet 26a for supplying the fuel passage paths 13a of separators 13 with a fuel, a second inlet 26b for supplying the oxygen passage paths 13b of the separators 13 with oxygen, a first outlet 26c for releasing the fuel left after the reaction in the electricity generating elements 11, and a second outlet 26d for releasing moisture generated from the reaction of the fuel and the oxygen in the electricity generating elements 11, and also for releasing the residual oxygen left after reacting the fuel. Accordingly, the gas diffusion layers 14a and 14b and the separators 13, which are positioned between the current collecting plates 26, have holes communicating with the first and second inlets 26a and 26b and the first and second outlets 26c and 26d. Here, the holes formed in the gas diffusion layers 14a and 14b include a tube-shaped sealing member (not shown in the drawing) formed of a polymer material or a rubber material, such as Teflon, polyimide, and the like, around the internal circumferential surface. The sealing member plays a role of impeding the fuel and oxygen from spreading through the internal circumferential surface all over the gas diffusion layers 14a and 14b, when the fuel and oxygen pass through the holes.

When the fuel cell stack 10 according to the first embodiment is operated, in each electricity generating element 11, a fuel is supplied to the gas diffusion layer 14a positioned at one side of the MEA 12 through the fuel passage path 13a of a separator 13 and is then diffused to the anode of the MEA 12 through the gas diffusion layer 14a. Oxygen is supplied to the gas diffusion layer 14b, positioned at the other side of the MEA 12, through the oxygen passage path 13b of another separator 13, and then diffused to the cathode of the MEA 12 through the gas diffusion layer 14b.

Thereby, at the anode of the MEA 12, the fuel is oxidized to generate electrons and protons. The protons are transferred to the cathode through the electrolyte membrane of the MEA 12 and the electrons are transferred to the cathode of an adjacent MEA 12 through gas diffusion layers 14a and 14b. Herein, current is generated by the movement of the electrons to generate electricity.

To illustrate in further detail, the regions A, extended from the gas diffusion layers 14a and 14b, are insulated from each other to form terminal elements in each electricity generating element 11. The terminal elements in adjacent electricity generating elements 11 are connected in series by connectors 23. Therefore, the electrons are transferred by the connectors 23 from the gas diffusion layer 14a contacting the anode of one electricity generating element 11 to the diffusion layer 14b contacting the cathode of another electricity generating element 11.

Thus, each electricity generating element 11 generates a current through the movement of the electrons and applies an electrical energy having a predetermined potential difference to a load, that is, a portable electronic device such as a laptop PC, PDA, or the like, using the current collecting plates 26 positioned at the outermost ends of the stack 10 and connected to terminals 28.

The fuel cell stack 10 according to the present embodiment enables electrical coupling between the electricity generating elements 11 through the conducting elements 20, each acting as a conductor and a terminal, even if the metal forming the separators 13 of the electricity generating elements 11 may be corroded by heat, moisture, and oxygen, which limit the movement of electrons in the separators 13 and increase electrical resistance of the separators 13.

A predetermined amount of heat is also generated at the cathode of an MEA 12 during the reduction reaction of protons transferred from the anode of the MEA 12, electrons transferred from the anode of the adjacent MEA 12, and oxygen supplied through the oxygen passage paths 13b of the separator 13.

The heat is transferred to the separator 13, and then, since the separator 13 is formed of a metal, is dissipated through the heat sink element 50, which is formed as extensions from the edges of the separator 13 outside the edges of the stack 10. Herein, a coolant supplier 60 ejects cool air towards the side of the stack 10. Therefore, the fuel cell stack 10 according to the present embodiment can cool down the heat dissipated through the heat sink element 50 by the cool air provided from a fan 61.

Figure 6:
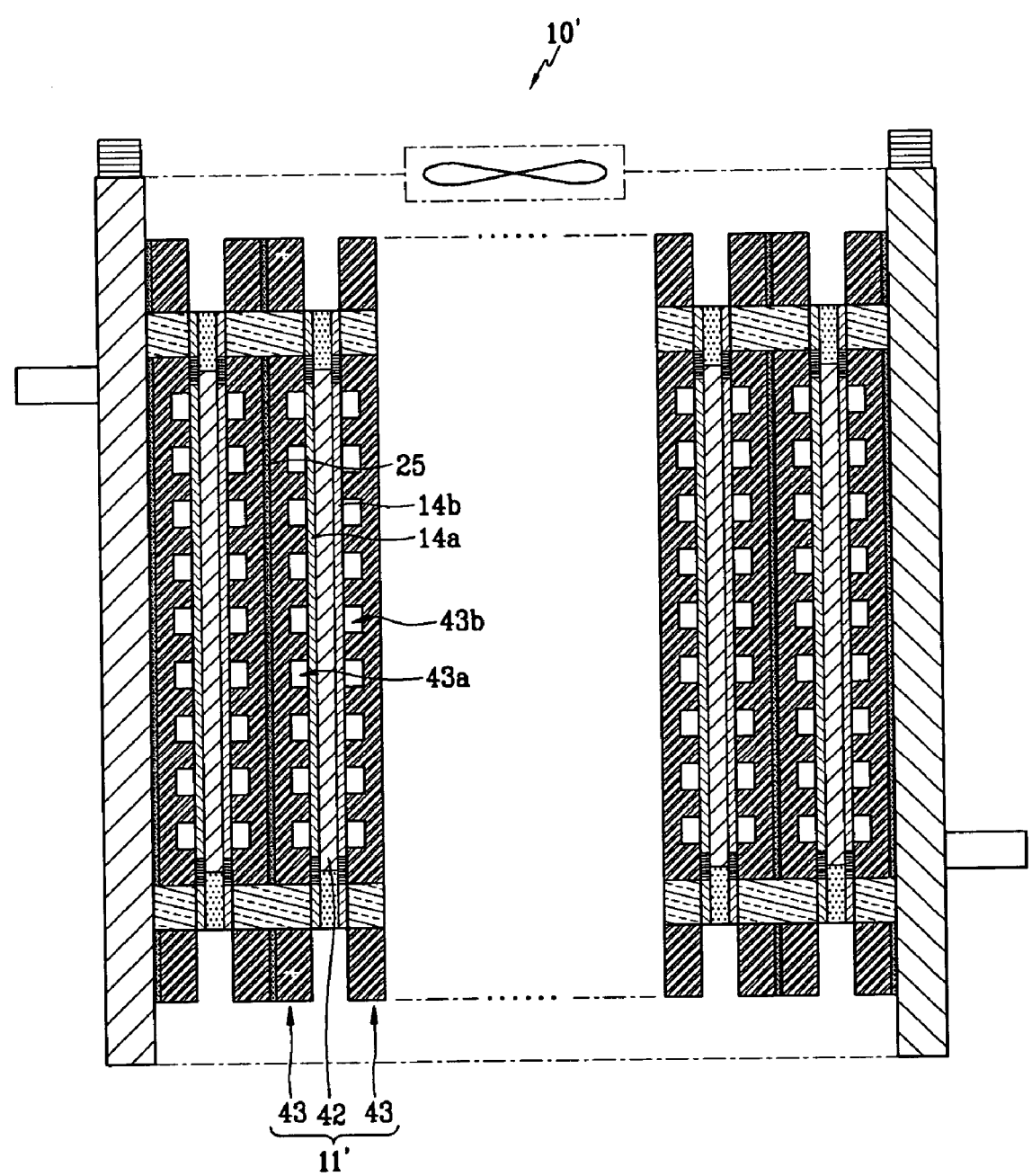
FIG. 6 is a cross-sectional schematic diagram illustrating a fuel cell stack according to a second embodiment of the present invention.

FIG. 6 is a cross-sectional schematic diagram illustrating a fuel cell stack according to a second embodiment of the present invention. In FIG. 6, members with the same function as members in FIG. 3 are assigned the same reference numerals as in FIG. 3.

Referring to FIG. 6, the fuel cell stack 10', according to the present embodiment, includes separators 43, facing each other at each side of MEAs 42, and having single-sided flow structures, unlike the two-sided flow structures of the first embodiment. That is, in a single electricity generating element 11', a fuel passage path 43a is formed at one side of one separator 43, and an oxygen passage path 43b is formed at one side of an opposing separator 43.

More particularly, one of the two opposing separators 43 in a single electricity generating element 11' is positioned substantially adjacent to the gas diffusion layer 14a, which is positioned at one side of the MEA 42. The one of the two opposing separators 43 includes a fuel passage path 43a at one side thereof adjacent to the gas diffusion layer 14a and a flat surface at the other side thereof. The other one of the two opposing separators 43 is positioned substantially adjacent to the gas diffusion layer 14b, which is positioned at the other side of the MEA 42. The separators 43 include an oxygen passage path 43b at one side thereof adjacent to the gas diffusion layer 14b and a flat surface at the other side thereof.

The flat surface of each separator 43 is stacked close to the flat surface of the separator 43 of an adjacent electricity generating element 11' so as to arrange the electricity generating elements 11' into the stack 10'.

The fuel cell stack 10', according to the present embodiment, includes second insulating elements 25 for substantially insulating areas between adjacent electricity generating elements 11'. The second insulating elements 25 may be disposed between separators 43 of adjacent electricity generating elements 11' and may be formed of shapes such as an insulating tape or an insulating sheet. The second insulating elements 25 are formed between the flat surfaces of the separators 43, that is to say, between the surfaces that do not contact the gas diffusion layers 14a and 14b in an adjacent electricity element 11'.

Since the separators 43 are made of metal, the separators 43 may be oxidized and corroded by heat, moisture, and oxygen during the electricity generation of the electricity generating elements 11', thereby increasing electrical resistance. Because of this, the electrons generated in each electricity generating element 11' may not be entirely directed to the gas diffusion layers 14a and 14b, and may instead be partially (and undesirably) directed to the separators 43 of adjacent electricity generating elements 11' through the separators 43. However, the second insulating elements 25 block such undesired movement of the electrons.

The second insulating elements 25 are composed of a synthetic polymer such as phenol resin, polyurethane, polyester resin, polyamide, acryl, urea/melamine resin, and/or silicone resin; and/or are composed of a varnish-based insulating material such as varnish.

Other elements of the stack 10' according to the present embodiment are substantially the same as those of the first embodiment, and thus a detailed description of these other elements is omitted.

Figure 7:
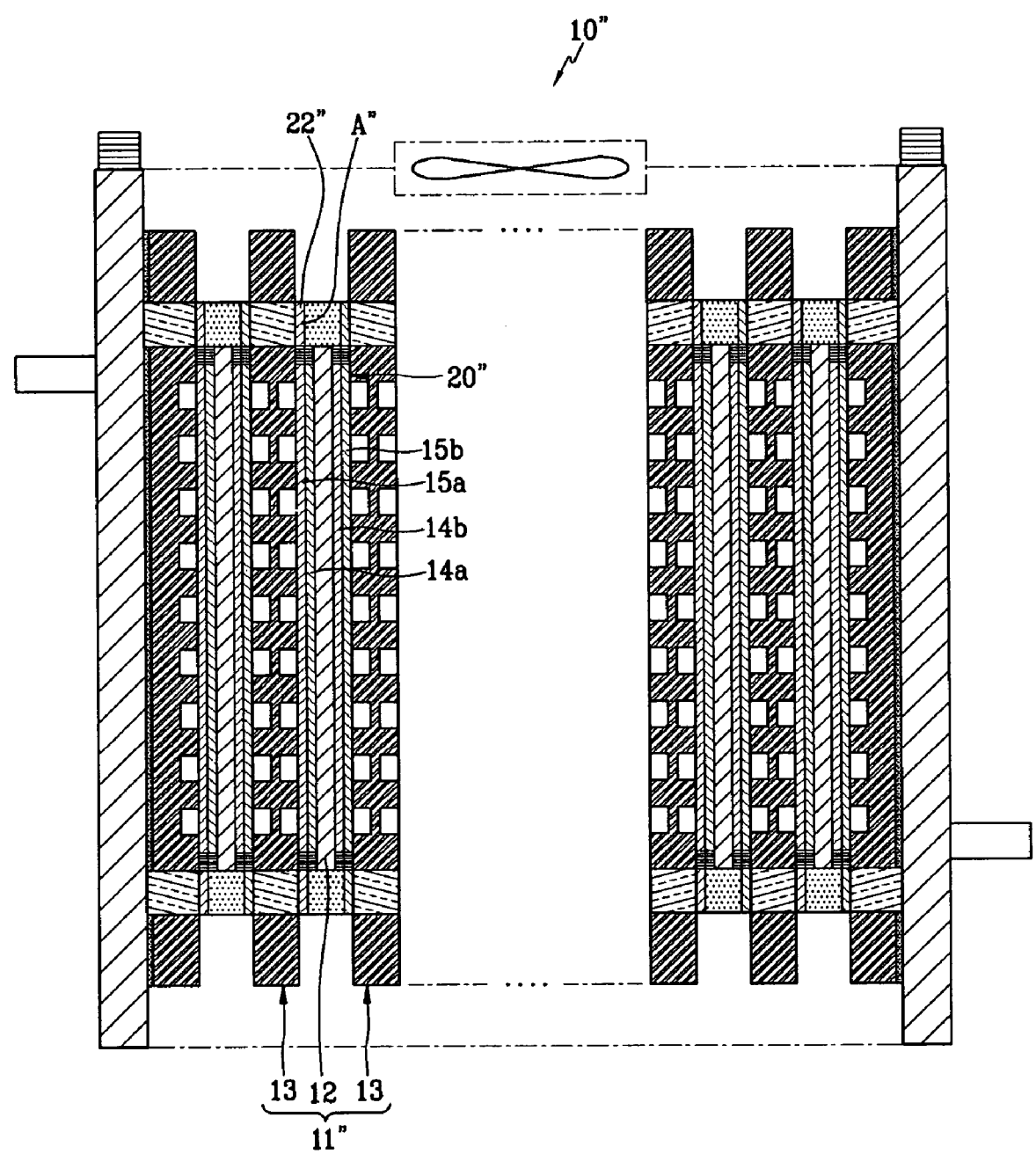
FIG. 7 is a cross-sectional schematic diagram illustrating a fuel cell stack according to a third embodiment of the present invention.

FIG. 7 is a cross-sectional schematic diagram illustrating a fuel cell stack according to a third embodiment of the present invention. In FIG. 7, members with the same function as members in FIG. 3 are assigned the same reference numerals as in FIG. 3.

Referring to FIG. 7, as in the first embodiment, the fuel cell stack 10" according to the third embodiment includes conducting elements 20" between separators 13 and MEAs 12 of electricity generating elements 11". The conducting elements 20''' include multi-layered gas diffusion layers 14a and 14b, and 15a and 15b respectively positioned facing each other at each side of the MEAs 12.

In FIG. 7, the conducting elements 20'' are shown to be double-layered gas diffusion layers 14a, 14b, 15a, and 15b positioned between the separators 13 and the MEAs 12. However, the present invention is not limited to the illustrated layers.

More particularly, the conducting elements 20'' include first diffusion layers 14a and 14b substantially adjacent to each side of the MEAs 12, and second diffusion layers 15a and 15b substantially adjacent to the first gas diffusion layers 14a and 14b and contacting respective separators 13. The conducting elements 20'' have a size corresponding to the size of the MEAs 12. The conducting elements 20'' are for electrically coupling areas between the electricity generating elements 11'' in the entire stack 10'', and also are for diffusing fuel and oxygen to the anodes and the cathodes of the MEAs 12. For this purpose, the edges of the second gas diffusion layers 15a and 15b are extended outside the edge of the first gas diffusion layers 14a and 14b, as shown by A'' in FIG. 7. The extended areas act as a terminal element 22'' for electrically connecting the electricity generating elements 11''

Herein, the structure of the fuel cell stack 10'' according to the present embodiment is illustrated for exemplary purposes, adopting the basic structure of the first embodiment. Of course, the present embodiment may adopt the basic structure of the second embodiment.

Other elements of the stack 10'' according to the present embodiment are substantially the same as those of the first embodiment, and thus a detailed description of these other elements is omitted.

Figure 8:
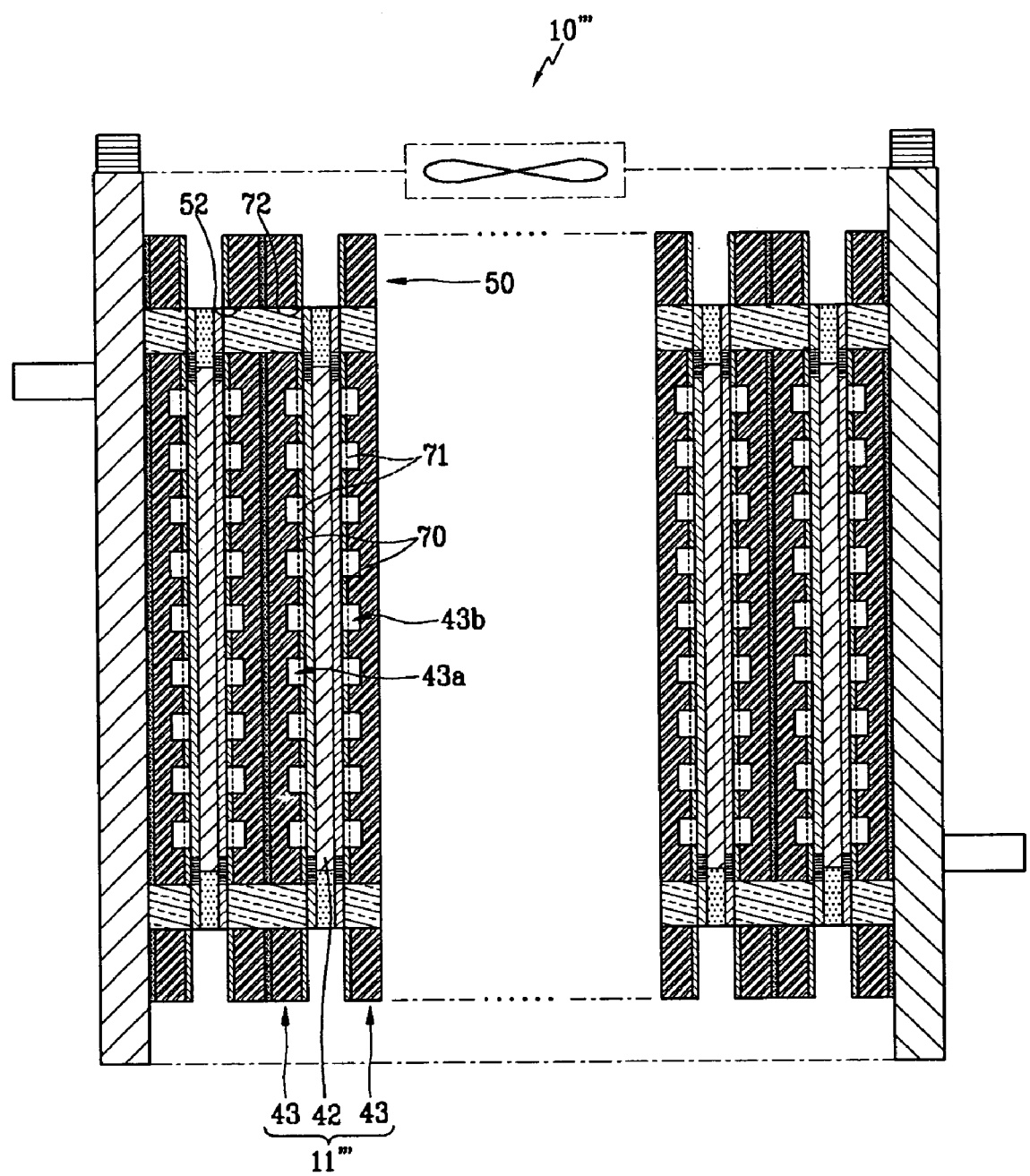
FIG. 8 is a cross-sectional schematic diagram illustrating a fuel cell stack according to a fourth embodiment of the present invention.

FIG. 8 is a cross-sectional schematic diagram illustrating a fuel cell stack according to a fourth embodiment of the present invention. In FIG. 8, members with the same function as members in FIG. 6 are assigned the same reference numerals as in FIG. 6.

Referring to the drawing, a fuel cell stack 10''' according to the present embodiment includes supporting plates 70 closely disposed to the separators 43. The supporting plates 70 additionally strengthen the separators 43 in each electricity generating element 11'''. Herein, the structure of the fuel cell stack 10''' according to the present embodiment is illustrated for exemplary purposes, adopting the basic structure of the second embodiment. Of course, the present embodiment may adopt the basic structure of the first embodiment.

According to the present embodiment, the supporting plates 70 are formed of the same metal material as the separators 43 to strengthen the separators 43, since the separators are formed as a thin metal, and are disposed closely contacting the fuel passage paths 43a and the oxygen passage paths 43b of the separators 43. Here, each supporting plate 70 has openings 71 corresponding to the fuel passage paths 43a and the oxygen passage paths 43b to open the fuel passage paths 43a and oxygen passage paths 43b. In addition, the supporting plate 70 has a slit 72, which can communicate with another slit 72 formed in the heat sink element 50 of the separator 43.

Other elements of the stack 10''' according to the present embodiment are substantially the same as those of the first embodiment, and thus a detailed description of these other elements is omitted.

Figure 9:
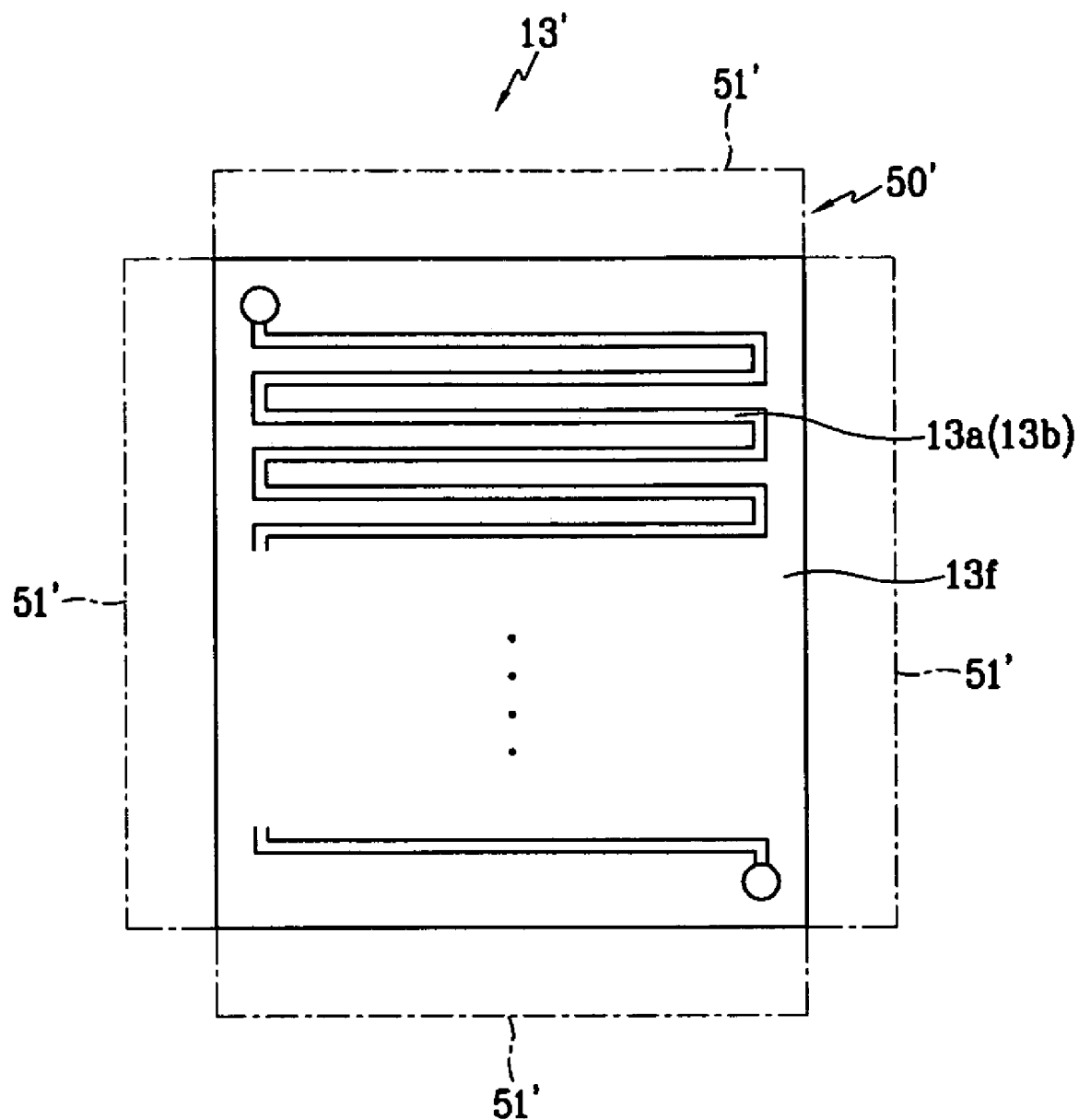
FIG. 9 is a plan schematic diagram of a separator according to a fifth embodiment of the present invention.

FIG. 9 is a plan schematic diagram of a separator according to a fifth embodiment of the present invention.

Referring to the drawing, a separator 13' is mounted with a separate heat sink element 50', that is, a heat sink plate 51', at the edge of a separator body 13f.

Herein, the separator body 13f has fuel passage paths 13a and/or oxygen passage paths 13b and can be mounted with the heat sink plate 51' at at least one edge thereof, as marked in an imaginary line. The heat sink plate 51' may be welded with the edge of the separator body 13f.

Figure 10:
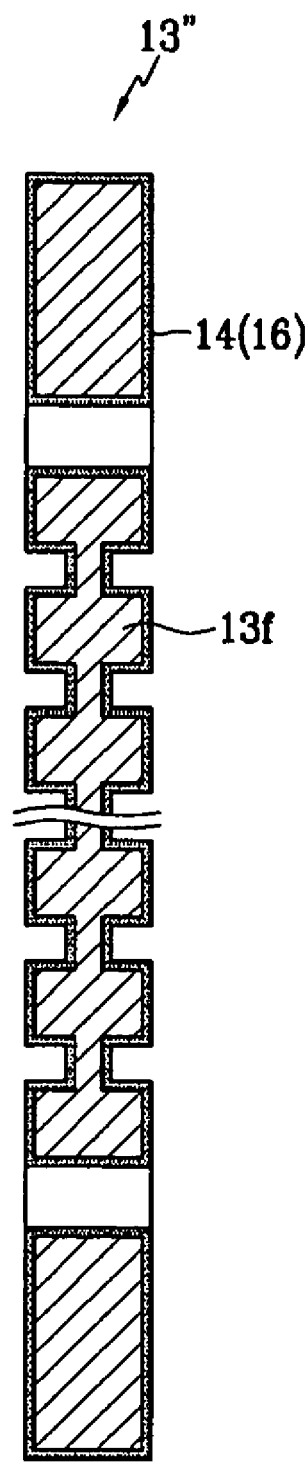
FIG. 10 is a plan schematic diagram of a separator according to a sixth embodiment of the present invention.

FIG. 10 is a plan schematic diagram of a separator according to a sixth embodiment of the present invention.

Referring to the drawing, a separator 13'' can be formed by coating the surface of the separator body 13f with an insulating membrane 14. Since the separator body 13f is formed of a metal material, the insulating membrane 14 plays a role of suppressing electrical resistance increased by corrosion of the separator body 13f. The insulating membrane 14 can be formed of a polymer or a Teflon material.

Alternatively, the separator 13'' can have an oxidation membrane 16 formed by oxidation-treating the surface of the separator body 13f.

As shown in the drawing of the exemplary variation, the separator 13'' is formed based on the structure of the first embodiment but can be based on that of the second one.

According to the above-described embodiments of the present invention, since a fuel cell stack can include a separator formed of a metal material, which has a property of press molding, the separator can contribute to decreasing the entire volume of a stack and also lower the manufacturing cost of the stack.

In addition, since the separator has a heat sink element at the edge, it can easily dissipate the heat generated from an electricity generating element. Therefore, since it can maintain an optimal temperature for operating a stack, it can lead to improvement of the entire stack.

Furthermore, the separator including a metal can be corroded by heat, moisture, and oxygen simultaneously generated when the stack generates electricity, but since the stack includes a conducting element that enables electrons to flow through a gas diffusion layer, it can be free from deteriorated performance characteristics or a decreased life span.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A fuel cell stack comprising:
an electricity generating element, which generates electrical energy through a reaction of a fuel and oxygen, wherein the electricity generating element comprises:
a membrane electrode assembly (MEA);
a first separator composed of a first electrically conductive material, positioned at a first side of the MEA, and having a heat sink element positioned therein for dissipating heat generated through the reaction of the fuel and oxygen;
a second separator positioned at a second side of the MEA, the second side being opposite to the first side; and
a conducting element positioned between the MEA and each of the first separator and the second separator, the conducting element allowing a flow of electrons generated in the MEA, the conducting element comprising: a gas diffusion layer positioned between the MEA and each of the first separator and the second separator; a terminal element composed of a third electrically conductive material extending beyond an edge of the gas diffusion layer electrically coupled with the first separator and the second separator; and a sealing member located between the gas diffusion layer and the terminal element to prevent the fuel and oxygen from diffusing to an outside of the MEA; wherein the heat sink element has a slit; an adjacent electricity generating element; and a connector composed of a second electrically conductive material, positioned between the electricity generating element and the adjacent electricity generating element to electrically connect the electricity generating elements; wherein the connector penetrates through the slit of the heat sink element; wherein the terminal element covers an entire portion of the connector exposed by the slit; and wherein the first electrically conductive material, the second electrically conductive material, and the third electrically conductive material are different from one another.

2. The fuel cell stack of claim 1, wherein the heat sink element is an extended portion of the first separator extending beyond an edge of the MEA.

3. The fuel cell stack of claim 1, wherein the heat sink element is a heat sink plate connected with an edge of the first separator.

4. The fuel cell stack of claim 1, wherein the electricity generating element comprises a supporting plate in close contact with the first separator and reinforcing the first separator.

5. The fuel cell stack of claim 4, wherein the supporting plate comprises a slit at a position corresponding to the heat sink element.

6. The fuel cell stack of claim 1, wherein the first separator is made of at least one metal selected from the group consisting of aluminum, copper, iron, nickel, cobalt, and alloys thereof.

7. The fuel cell stack of claim 6, wherein the first separator comprises an insulating layer coated on a surface thereof.

8. The fuel cell stack of claim 6, wherein the first separator comprises an oxide layer coated on a surface thereof.

9. The fuel cell stack of claim 1, wherein the gas diffusion layer is formed of at least one material selected from the group consisting of a sheet-shaped carbon composite, carbon paper, and carbon cloth.

10. The fuel cell stack of claim 1, wherein the sealing member is formed at a position of the gas diffusion layer corresponding to edges of the MEA and is made of a polymer material or a rubber material.

11. The fuel cell stack of claim 1, wherein:
the adjacent electricity generating element has a terminal element; and
the connector is positioned between the terminal element of the electricity generating element and the terminal element of the adjacent electricity generating element to electrically connect the electricity generating elements in series.

12. The fuel cell stack of claim 11, wherein the connector is composed of a conductive carbon material, has a block shape, and is mounted between the terminal element of the electricity generating element and the adjacent electricity generating element.

13. The fuel cell stack of claim 1, further comprising a first insulating element to insulate each conducting element in the electricity generating element.

14. The fuel cell stack of claim 13, wherein the first insulating element is made of a polymer material or a rubber material.

15. The fuel cell stack of claim 1, further comprising:
an adjacent electricity generating element having a separator; and
a second insulating element positioned between the first separator of the electricity generating element and the separator of the adjacent electricity generating element, and insulating the electricity generating element and the adjacent electricity generating element.

16. The fuel cell stack of claim 15, wherein the second insulating element is made of a polymer material or a rubber material.

17. The fuel cell stack of claim 1, wherein the first separator comprises a fuel passage path in close contact with the gas diffusion layer positioned at the first side of the MEA and supplies fuel to the gas diffusion layer, and
wherein the second separator comprises an oxygen passage path in close contact with a second gas diffusion layer positioned at the second side of the MEA and supplies oxygen to the second gas diffusion layer.

18. The fuel cell stack of claim 17, wherein the fuel passage path or the oxygen passage path is fabricated by press-forming of plate-shaped metal.

19. The fuel cell stack of claim 17, wherein the fuel passage path or the oxygen passage path is fabricated by molding.

20. The fuel cell stack of claim 1, wherein the first separator comprises:
a fuel passage path in close contact with the gas diffusion layer positioned at the first side of the MEA and supplies fuel to the gas diffusion layer; and
an oxygen passage path in close contact with a second gas diffusion layer on an opposite side of the first separator as the fuel passage path, the oxygen passage path supplying oxygen to the second gas diffusion layer.

21. The fuel cell stack of claim 1, wherein the second conductive material is a metal selected from the group consisting of aluminum, copper, iron, nickel, cobalt, and alloys thereof.

22. The fuel cell stack of claim 1, wherein the connector is located entirely within the slit.

* * * * *

UNITED STATES PATENT AND TRADEMARK OFFICE
CERTIFICATE OF CORRECTION

| | | |
|---|---|---|
| PATENT NO. | : 7,981,562 B2 | Page 1 of 1 |
| APPLICATION NO. | : 11/480617 | |
| DATED | : July 19, 2011 | |
| INVENTOR(S) | : Sang-Won Lee | |

It is certified that error appears in the above-identified patent and that said Letters Patent is hereby corrected as shown below:

On the Title Page

Item (56) References Cited, Other Publications, page 2, left column, line 5.   Delete "a," Insert -- A, --

In the Claims

Column 10, Claim 1, line 50.   Delete "membrane electrode"
Insert -- membrane-electrode --

Signed and Sealed this
Fifth Day of June, 2012

David J. Kappos
*Director of the United States Patent and Trademark Office*